US010755177B1

(12) United States Patent
Dabney et al.

(10) Patent No.: US 10,755,177 B1
(45) Date of Patent: Aug. 25, 2020

(54) VOICE USER INTERFACE KNOWLEDGE ACQUISITION SYSTEM

(71) Applicant: Amazon Technologies, Inc., Seattle, WA (US)

(72) Inventors: William Clinton Dabney, Seattle, WA (US); Arpit Gupta, Seattle, WA (US); Faisal Ladhak, Seattle, WA (US); Markus Dreyer, Seattle, WA (US); Anjishnu Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 793 days.

(21) Appl. No.: 14/985,704

(22) Filed: Dec. 31, 2015

(51) Int. Cl.
*G06N 5/02* (2006.01)
*G06F 40/40* (2020.01)

(52) U.S. Cl.
CPC .............. *G06N 5/02* (2013.01); *G06F 40/40* (2020.01)

(58) Field of Classification Search
CPC ............ G06N 5/02; G06F 17/28; G06F 40/40
See application file for complete search history.

(56) References Cited

U.S. PATENT DOCUMENTS

| | | | |
|---|---|---|---|
| 5,694,592 A * | 12/1997 | Driscoll | G06F 17/30663 |
| 7,107,254 B1 * | 9/2006 | Dumais | G06N 7/005 706/12 |
| 8,463,648 B1 * | 6/2013 | Bierner | G06Q 30/02 705/14.44 |
| 9,817,897 B1 * | 11/2017 | Wang | G06F 17/30654 |
| 2007/0138267 A1 * | 6/2007 | Singer-Harter | G06Q 20/20 235/383 |
| 2009/0070322 A1 * | 3/2009 | Salvetti | G06F 16/3334 |
| 2013/0054511 A1 * | 2/2013 | Gomadam | G06F 17/30303 707/602 |
| 2013/0091052 A1 * | 4/2013 | Kaperdal | G06Q 20/227 705/39 |
| 2013/0097178 A1 * | 4/2013 | Song | G06Q 50/10 707/748 |
| 2013/0155118 A1 * | 6/2013 | Robinson | G06F 17/30716 345/672 |
| 2014/0108453 A1 * | 4/2014 | Venkataraman | G06F 17/30997 707/774 |
| 2015/0039536 A1 * | 2/2015 | Cook | G06N 5/02 706/11 |
| 2016/0350860 A1 * | 12/2016 | Dintenfass | G06Q 40/06 |

OTHER PUBLICATIONS

Suryanto et al, "Quality-Aware Collaborative Question Answering: Methods and Evaluation", Feb. 2009, WSDM '09: Proceedings of the Second ACM International Conference on Web Search and Data Mining, pp. 1-10 (Year: 2009).*

(Continued)

*Primary Examiner* — Robert A Cassity
*Assistant Examiner* — Brent Johnston Hoover
(74) *Attorney, Agent, or Firm* — Pierce Atwood LLP

(57) ABSTRACT

A voice user interface (VUI) system use collaborative filtering to expand its own knowledge base. The system is designed to improve the accuracy and performance of the Natural Language Understanding (NLU) processing that underlies VUIs. The system leverages the knowledge of system users to crowdsource new information.

25 Claims, 7 Drawing Sheets

(56) References Cited

OTHER PUBLICATIONS

Ji et al., "Learning to rank for question routing in community question answering", Oct. 2013, CIKM'13, pp. 2363-2368 (Year: 2013).*

Berant, at al. Semantic Parsing on Freebase from Question-Answer Pairs. Conference on Empirical Methods in Natural Language Processing. pp. 1533-1544. vol. 2. No. 5. 2013.

Mikolov, at al. Distributed Representations of Words and Phrases and their Compositionality. Advances in neural information processing systems. 2013.

Pennington, at al. GloVe: Global Vectors for Word Representation. Stanford University Natural Language Processing Group. Downloaded from http:/nlp.stanford.edu/projects/glove/ on Nov. 5, 2015.

Pennington, at al. GloVe: Global Vectors for Word Representation. Conference on Empirical Methods in Natural Language Processing. vol. 14. 2014.

* cited by examiner

VOICE USER INTERFACE KNOWLEDGE ACQUISITION SYSTEM

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with natural language processing (NLP) techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

When voice-user interface (VUI) systems are used to process and answer user questions but fail to provide the correct answer, the system may have failed to correctly understand the question, or the system may lack the facts needed to answer the question. To identify whether the question was misunderstood, after performing semantic parsing on the question, the system may reconstruct the question based on its "understanding" and repeat the question back to the user to verify that the question was correctly understood. But even when the system got the question right, and recognizes that the question is asking for information such as a relationship between named entities, the system may possess insufficient knowledge to answer the question. This may be because the system lacks a framework for processing the relationship, has insufficient data about one or both entities, or a combination thereof.

A VUI knowledge acquisition framework is disclosed to complement a VUI assistant that utilizes collaborative filtering to expand its own knowledge base. The system is designed to improve the accuracy and performance of the Natural Language Understanding (NLU) processing that underlies VUIs. An idea behind the system is to leverage an untapped resource to generate useful knowledge data for a VUI assistant: people who use the system.

Existing VUI systems use programmed databases and data mining to acquire knowledge, but have yet to take advantage of user crowdsourcing to augment their initial seed knowledge base. The improved VUI system uses machine learning techniques to find gaps in its own Question/Answering capabilities and to identify humans contributors that provide high-quality answers. By soliciting responses from human contributors, the system is able to collaboratively augment its current capabilities with their expert knowledge. The system is rapidly scalable to previously inaccessible knowledge sources, and can fix a large fraction of its own flaws without explicit human intervention.

Several machine-user interactions models may be used to improve system performance. A first model is to have user's correct the VUI assistant when it makes mistakes. A second model is to have users "teach" the VUI assistant facts that are relevant to them (the user). A third model is to have users using the Internet add knowledge to the system in exchange for incentivizing benefits (e.g., credits for software downloads, participation in exclusive beta programs, acknowledgement on an online leaderboard to create an atmosphere of competition between volunteers, etc.). A fourth model is the gamification of knowledge acquisition, where the VUI system collects information from users in a trivia-game style fashion. The first three interaction models can be used to seed "facts" into the system. All four models can be used to validate new "facts."

Figure 1:
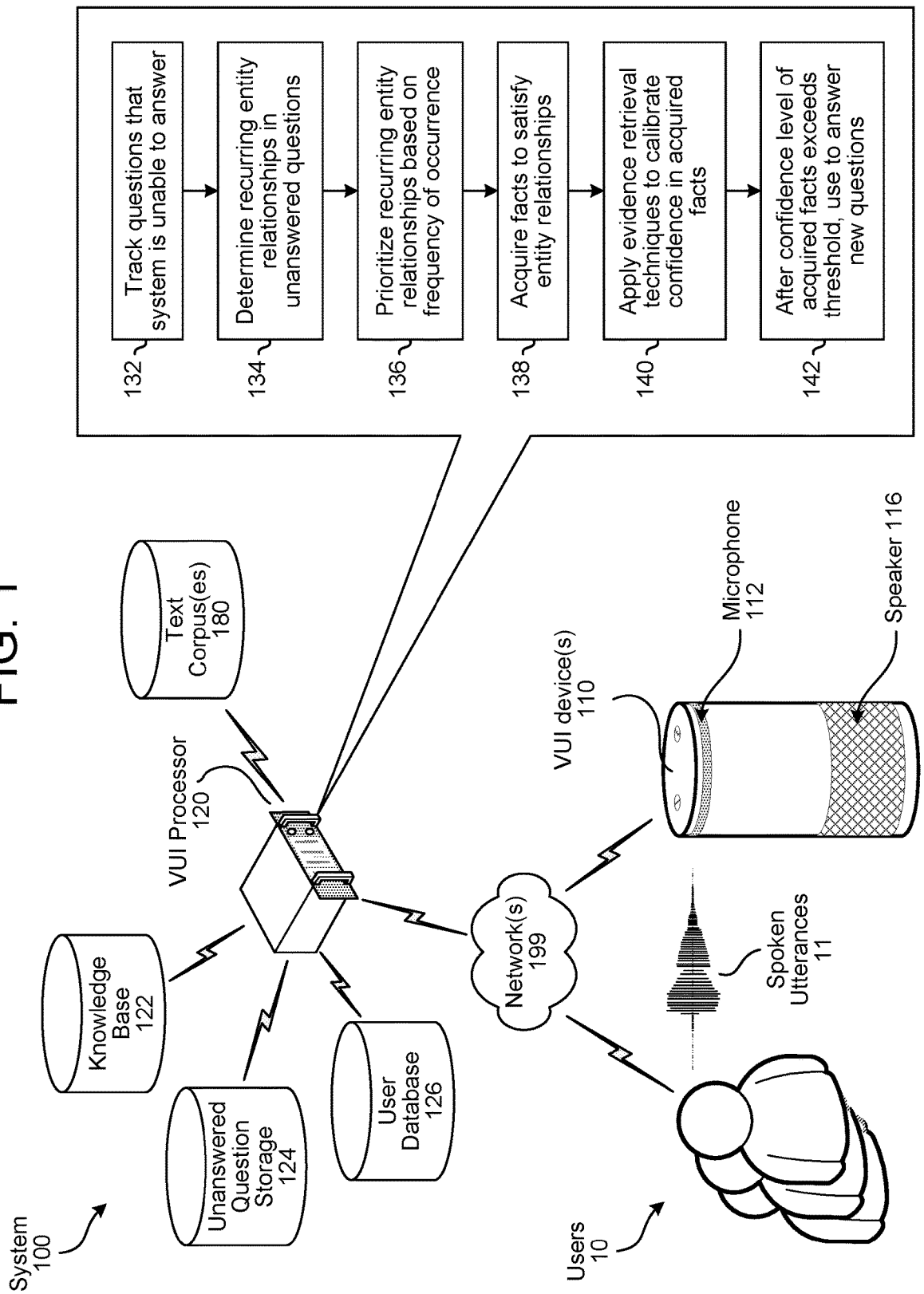
FIG. 1 illustrates a system for acquiring crowdsourced answers to unanswered questions.

FIG. 1 illustrates a system 100 where a VUI processor 120 crowdsources information in order to expand its database. The VUI processor 120 may interact with users 10 via VUI devices that receive input from the users 10 as spoken utterances. Each VUI device includes a microphone 112 and a speaker 116 by which speech-based interactions are conducted with the users 10. The VUI device(s) may perform some of the VUI-related processing on the utterances 11, such as ASR and NLU, or may send audio data comprising the utterances 11, or processed data derived from the utterances, to the VUI processor 120 for one or both of these processes.

The VUI processor 120 supports a VUI-type assistant interface to which the users 10 can ask questions. The VUI processor 120 queries a knowledge base 122 for answers to received questions, and relays the answers back to the user(s) 10 via the VUI interface. When the VUI processor is unable to answer a question, after the question has been semantically parsed into a machine readable form to recognize the relation being asked about between entities, the parsed relation and entity data is stored in a unanswered question storage 124 with an indication that the question could not be answered. An "entity" is a noun that is the grammatical subject and/or object of the relationship in the question, where the relationship may be characterized grammatically by a verb, where the semantic meaning underlying the verb may define the entity relationship.

By storing the parsed information, the VUI processor 120 tracks (132) the questions that it was unable to answer. From this stored information, the VUI processor determines (134) recurring entity relationships in unanswered questions. In some cases, stored relations between entities may be the same. In those cases, the VUI processor can formulate a new question to acquire information about the relationship(s) based on the stored relations.

In other cases, by comparing semantic meanings of the root words that define the relations, a recurring relationship may be identified where although different words were used, the underlying semantic meaning of the questions were the same. In that case, the system can formulate a new question to acquire information based on the semantic meaning underlying the question, such that the new question may provide answers multiple unanswered questions using completely different phrasing.

As another case, associations between multiple relations may be identified using an inference engine, and a new question formulated based on bridging these associations. For example, given relations such as X is the mother of Y, Y is the friend of Z, the system can generate a bridging questions such as "How is X associated with Z?" The VUI processor 120 will generate all possible questions and then determine which questions to use by applying machine learning to determine which questions are most relevant to the users (e.g., based on frequency of occurrence), prioritizing (136) recurring entity relationships. The VUI processor 120 selects questions to send to the users 10 to acquire facts (138) based on the priority assigned to the entity relationships, sending high priority questions prior to low priority questions, where the questions seek facts (or seek to confirm facts) to satisfy those relationships and answer the questions.

Similar relationships are mapped to the logical form of a single relationship. So similar questions may be mapped to a single form. From the single logical form, a natural language question is generated. Based on relational structures in a relational database, phrases having common and similar semantic meaning may be identified, allowing similar questions to be identified based on a commonality of semantic meaning. Meanings may be represented as nodes of a graph in the relational database, where semantic meanings that are conceptually similar will be proximate to each other, whereas semantic meanings that are conceptually different will be distant from each other, where the distance corresponds to the number of intervening nodes in the graph between semantic meanings.

Formulaic questions may generated based on the relationship between concepts in the relational database, but more complicated questions may be generated using the semantic framework of the single form. Among other natural-language generation techniques, question generation may be grammar-based using a finite state machine or a context-free grammar that expands the logical form into natural language text.

The finite state machine is encoded with language generation rules. For each logical form, it will have one or more natural language forms. Using transduction, the state machine may be used to generate natural-language questions, converting a graph of linked logical forms into natural language text. A context-free grammar instead generates a natural language question by rewriting the logical form into a natural language sentence. A weighted-context grammar may be used, where for each relation, there may be a few different ways to express the relation. There are weights attached to each rule associated with a relation, whereby the sentence may be constrained to specific logical forms based on weight optimality.

The acquiring (138) of facts may involve use of various heuristics to identify which users are most suitable to be asked the respective questions. For example, a category of the questions may be determined based upon keyword. Users may be selected based on having answered questions in the past associated with the category, where their answers were consistent with what the system statistics indicates is "truth" based on confidence scores assigned to the answers over time, where the confidence scores are produced based on aggregated answers to the same questions. The aggregated answers may be, for example, crowdsourced and compiled based on answers obtained from "other" resources. Individual user confidence values may be stored, among other places, in a user database 126 together with each user's profile.

One of these "other" resources is data mining evidence retrieval techniques, which may be applied (140) to calibrate confidence levels in the acquired facts. After users' answers to a crowd-sourced fact are received, an answer will be assigned a confidence level based on the a confidence level associated with each user (based on the accuracy of their past answers in the category and/or in general). This confidence level may be refined over time, such as by data mining electronic data sources such as online news and other Internet-based resources (e.g., information databases, online encyclopedias, etc.) to determine if the provided "fact" is consistent with the data mining results. After the confidence level of acquired facts exceeds a threshold value and the acquired facts have been added to the knowledge base 122, the facts will be used (142) to answer future questions received via the VUI of the devices 110.

An example of an exchange would be: User: "System, I want to teach you something." VUI Processor 120 via a VUI Device 110: "I am always ready to learn." User: "Tom Cruise Married Nicole Kidman in 1990." A semantic parser of the VUI Processor 120 would then generate the fact: {'Entity1':'TomCruise', 'Relation': 'EVENT.MARRIAGE', 'Entity2': 'NicoleKidman', 'Metadata':{'Year': '1990'}}. These relations can then be added to a pipeline for confidence calibration.

The confidence measures of such user-provided facts can be calibrated using a variety of different techniques. The data mining "evidence retrieval techniques" (140) may be based on text searches of online news services and online encyclopedias for fact validation, inter-annotator-agreement (e.g., a score of how much homogeneity, or consensus, there is regarding the "fact" between sources), and a quantification of how many news and other websites link to a website validating a fact, in addition to a "teacher's" past record of quality knowledge transfer (as represented by their confidence score, such as might be indicated by a leaderboard and/or in user database 126).

After reaching a certain confidence threshold, the "fact" would be fed into VUI system's knowledge graph in knowledge base 122 and used for inferencing answers when a user asks a new question (142). The confidence for a fact can continue to be calibrated over time. Although a system may treat them as such, "facts" are not static. Facts may be assigned exponentially decaying weights to differentiate old information versus new information, so that old facts may be automatically discarded as new information arises.

As confidence scores become more robust over time, heuristic algorithms can be applied to seek out which facts that need to be verified based on their decaying weights (e.g., reacquiring facts to validate facts and entity relationships with middling confidence—neither very high nor very low) and push these facts and relationships out to users for verification, where the users' past interactions have established them as knowledgeable experts in the relevant fields.

An example would be when the system determines that it is unable to answer a recurring question such as: "How many carbon atoms are in a penicillin molecule?" Standard machine learning algorithms may be used to determine that this question is related to the chemistry (e.g., based on keywords: carbon, atom, molecule) and medicine (keyword: penicillin) categories. The question may then be forwarded to "expert" users in those specific categories. Expert users may be determined, among other ways, by selecting topscoring users on a knowledge-provider leaderboard (referring back to the third model incentivizing user responses).

Based on the replies received from the expert users, the VUI Processor 120 calibrates the confidence values of received facts, ingesting the requisite piece of knowledge into its knowledge base 122. As the confidence score increases, the system 100 will be able to answer such questions as they become popular with an increasing probability of actually having the correct answer. For background, see generally "Semantic parsing on Freebase from question-answer pairs" by Jonathan Berant, Andrew Chou, Roy Frostig, and Percy Liang, Empirical Methods in Natural Language Processing (EMNLP), 2013 (pages 1533-1544). In that paper, the statistical model is trained using training data that consists of question and answer pairs, rather than a logical form, relying on notation from a human annotator. Each logical form used for training by Berant is unary or binary, as discussed in sections 2.2 and 2.3 of the Berant. In comparison, the VUI processor 120 may be trained using question and answer pairs, but determines the logical form as part of the process without the intervention of a human annotator.

These approaches to automated knowledge acquisition are expected to rapidly improve the ability of the VUI system to answer general questions received from user by providing the system with new resources for acquiring and ingesting knowledge.

With the right incentive structure to participants, and a VUI built on a high-quality Automatic Speech Recognition (ASR) and a semantic parser, the VUI-based system reduces reliance on dedicated specialized human annotators manually entering facts, expanding annotation to benefit from collaborative participation. Specialized human annotators for question answering can be difficult to train to do high-precision annotations. In comparison, new relationships between entities can be inferred from the NLU data, identifying recurring entity-relationship frameworks that manual annotators may otherwise miss. With the active learning system accepting "facts" with very high confidences, and rejecting facts with very low confidences as "hypotheses," the use of manual annotators may be reduced to review of uncertain facts where the system 100 is unable to make a determination, allowing a large amount of facts to be processed using a relatively small data set.

This approach also facilitates expanding the knowledge base to answer queries relevant for specialized use-cases such as medicine, relying on collaborative knowledge to train the system. Facts and relationship data can be initially seeded using raw text, such as evidence acquired using evidence retrieval techniques or a dump of information from a pre-existing database. Any facts that the improved VUI system 100 assigns indeterminate confidence scores may be forwarded to a specialized pool of user candidates (e.g. senior doctors) to refine the information going into the system.

Mining data from traditional data sources can be a slow process. By mining data directly from VUI system users 10, the system 100 can learn facts that are more specialized than those available from traditional knowledge-base sources or established news firms. Some examples of topic areas for which traditional data mining techniques are poorly suited include celebrity tabloid journalism, esoteric fan-sourced knowledge about books and television shows, trends that go viral on the Internet, and rapidly evolving fields such as politics and sports.

Since the pool of people contributing to the knowledge base 122 are a subset of the final group of users, it is expected that the knowledge contributors will be interested in similar fields and be able to answer questions that are of relevance to their peers while building up a richer fact-based representation of the world.

Figure 2:
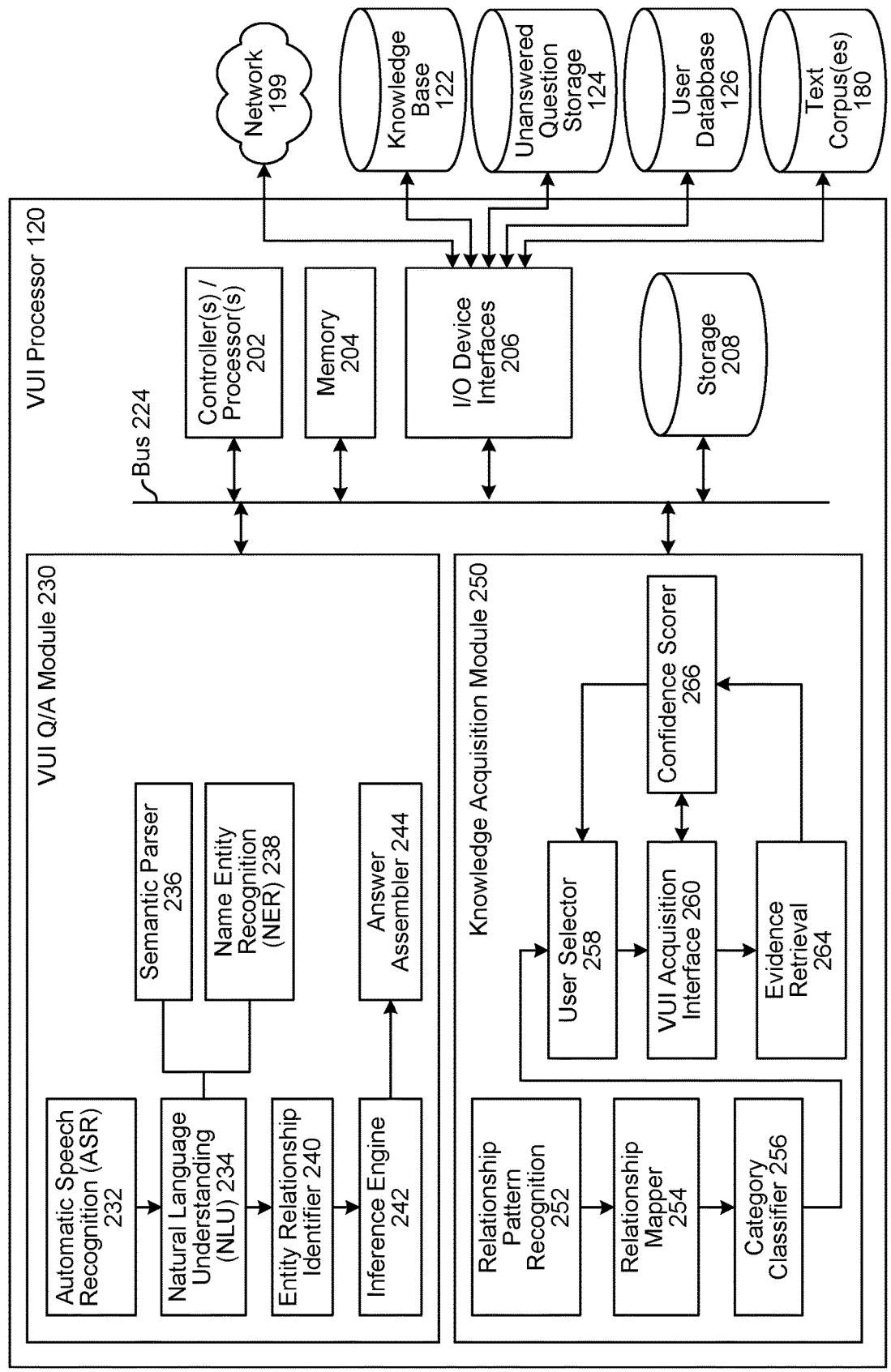
FIG. 2 is a block diagram conceptually illustrating example components of a VUI Processor 120.

FIG. 2 is a block diagram conceptually illustrating example components of the VUI Processor 120. In operation, components of the VUI Processor 120 may include computer-readable and computer-executable instructions that reside on the Processor 120, as will be discussed further below. The components of the VUI Processor 120 may be distributed across multiple physical devices, and some of the components may be included in the VUI device(s) 110 themselves (e.g., ASR component 232).

The system 100 includes audio capture device(s), such as a microphone or an array of microphones 112 connected to each of the VUI devices 110 that interacts directly with the users 10. The microphone(s) 112 may be external to the device(s) 110, and/or may external such as a microphone of a wireless headset. The audio input device may be integrated into the VUI device(s) 110 or may be separate.

The system 100 may also include an audio output device for producing sound by which the VUI responds to the users 10, such as speaker(s) 116 and/or the wireless headset connected to the VUI device(s) 110. The audio output device may be integrated into the VUI device(s) 110 or may be separate.

The VUI Processor 120 may include one or more controllers/processors 202, that may each include a central processing unit (CPU) for processing data and computer-readable instructions, and a memory 204 for storing data and instructions. The memory 204 may include volatile random access memory (RAM), non-volatile read only memory (ROM), non-volatile magnetoresistive (MRAM) and/or other types of memory. The VUI Processor 120 may also include a data storage component 208, for storing data and controller/processor-executable instructions (e.g., instructions to perform the steps and processes illustrated and discussed in connection with FIGS. 1 and 2). The data storage component 208 may include one or more non-volatile storage types such as magnetic storage, optical storage, solid-state storage, etc. The VUI processor 120 may also be connected to removable or external non-volatile memory and/or storage (such as a removable memory card, memory key drive, networked storage, etc.) through the input/output device interfaces 206.

Computer instructions for operating the VUI Processor 120 and its various components may be executed by the controller(s)/processor(s) 202, using the memory 204 as temporary "working" storage at runtime. The computer instructions may be stored in a non-transitory manner in non-volatile memory 204, storage 208, or an external device. Alternatively, some or all of the executable instructions may be embedded in hardware or firmware in addition to or instead of software.

The VUI processor 120 includes input/output device interfaces 206. A variety of components may be connected through the input/output device interfaces 206, such as the links to the network(s) 199, the knowledge base 122, unanswered question storage 124, and the user profile database 126. The input/output device interfaces 206 may also include an interface for an external peripheral device connection such as universal serial bus (USB), FireWire, Thunderbolt or other connection protocol. Through the network(s) 199, the system 100 may be distributed across a networked environment.

The VUI Processor 120 may include an address/data bus 224 for conveying data among components of the VUI Processor 120. Each component within the VUI Processor 120 may also be directly connected to other components in addition to (or instead of) being connected to other components across the bus 224.

The VUI Processor 120 further includes a VUI question and answer (Q/A) module 230 that receives user questions, processes the questions, retrieves data from the knowledge base 122 to determine answers (if sufficient data is available). The VUI Processor 120 also includes a knowledge acquisition module 250 that crowdsources new facts for user questions for which the VUI Q/A module 230 was unable to determine answers. Each of these modules and their components may manifest as instructions stored in memory 204 and/or storage 208, where the instructions are executed by the controller(s)/processor(s) 202.

Referring to the Q/A module 230, an automatic speech recognition (ASR) engine 232 converts spoken utterances into text, if not already converted into text when received from the VUI device 110. The text is processed by a natural language understanding (NLU) engine 234, which determines the semantic meaning of the text. The NLU engine 234 utilizes a semantic parser 236 to interpret the relationship between words in a sentence, and a name entity recognition (NER) engine 238 to identify words in a sentence that correspond to place names, people names, etc. The NLU process may be configured to parse text and tag the annotated text with machine-readable meanings as part of NLU processing. For example, processing the text "call mom," "call" may be tagged as a command (to execute a phone call) and "mom" may be tagged as a specific entity and object of the command (and the telephone number for the entity corresponding to "mom" stored in a contact list may be included in the annotated result).

The semantic parser 236 may parse a question to identify words as subject, object, verb, preposition, etc., based on grammar rules and models, prior to the name entity recognition (NER) engine 238 processing the text to recognizing named entities. This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like. Based on sentence structure and keywords, rules and heuristics executed by the NLU 234 can identify a sentence as forming a question.

The question is passed to an entity relationship identifier 240. The entity relationship identifier 240 compares words in the processed question to determine whether the relationship corresponds to an existing framework, or whether a new framework needs to be created. The relationship framework and the entities identified in the question are then passed to an inference engine 242. Based on the relationship framework, the inference engine compares entity data in the knowledge base 122 to the identified entities, to determine whether the relationship between entities is consistent with that in the knowledge base 122. If the entity-relationship identifier is unable to identify one of the entities in the question, the inference engine 242 attempts to determine an identity of the entity from the knowledge base 122 based on the relationship, comparing the identified relationship with relationships for the known entity to infer the identity of the unknown entity.

For example, the semantic meaning attributed to the identified verb may be used by the entity relationship identifier 240 to identify the relationship between entities in a question, with the entity relationship identifier comparing the relationship between entities in the query with stored relationship frameworks. A framework may specify slots or fields for entities, such as {SubjectEntity} {Relationship} {ObjectEntity}. The entity relationship identifier 240 identifies the framework most closely matching the NLU-processed question. Among other approaches, entity relationships may be structured as tuples. A tuple is a finite ordered list of elements.

If a framework is identified and all entity slots/fields are identified, the inference engine 242 may process the information as a query requesting confirmation of the relationship defined by the framework. For example, if a question is received such as "Is Tom Cruise married to Nicole Kidman?," the NLU 234, in conjunction with the semantic parser 236 and NER engine 238 may identify two entities: "Tom Cruise" and "Nicole Kidman." A framework based on the "married to" relationship may be identified by the entity relationship identifier, such as a framework specifying {Entity1} {married} {Entity2}, where {married} refers to the underlying concept of the relationship identified by the NLU engine 234, rather than specific words in the question.

At this point in the process, "married to" is identified as a verb based on a word database, but no determination has been made as to the semantic meaning of "Tom Cruise" and "Nicole Kidman," but based on grammar rules and models and NER processing, it is determined that these phrases relate to the grammatical subject/object of the query, such that the phases may be tagged as entities.

Since the {Entity1} {married} {Entity2} structure of the question matches a relationship a framework and all fields/slots are identified, the inference engine 242 will compare the processed information with information in the knowledge base 122, and based on the result, the answer assembler 244 will formulate a true/false answer.

In comparison, the same framework may be the closes match for a question such as "Who is Tom Cruise married to?" However, in this case, one of the entity fields remains unidentified. In that case, the inference engine 242 will attempt to determine the unidentified entity based on information in the knowledge base 122, with the answer assembler 244 using the result to formulate an answer.

If the inference engine 242 successfully finds a match between the framework-based relationship and the relationship between the entities in the knowledge base 122, and/or infers missing facts from data in the knowledge base 122, the results are passed to an answer assembler 244 that generates an answer in natural language. Either the VUI processor 120 or the VUI device 110 may include a speech synthesis module to convert the assembled answer to the user as speech. If the inference engine 242 is unable to determine an answer the question, information such as the NLU results and the identified relationship (if any) are stored in unanswered question storage 124.

If the inference engine 242 does generate an answer to the question, but a user indicates that the answer is wrong, the information may also be stored in unanswered question storage 124, treating the question as unanswered. The unanswered questions may be stored in multiple processed forms, such as the original text and as parsed. Among other advantages of storing in multiple forms is if a component of the system is improved, such as the semantic parser 236, the questions can be reprocessed.

A relationship pattern recognition module 252 filters through the unanswered questions to determine questions for which answers will be crowd sourced using collaborative filtering. Identified relationships in the unanswered questions may be semantically mapped based on semantic meaning to determine overlapping and related entity relations, and related relationships. This mapping may be based on semantic vectors, which are an NLU vector representation of the semantic meaning of a word or phrase. Unanswered questions that use a relationship framework that is not recognized (e.g., new) by the system, and questions in which no entity is recognized, may be assigned to a separate workflow for resolution, in comparison to unanswered questions with identifiable relationships where at least one entity is recognized.

Rules may be applied to determine semantic similarity between different potential relationships. A semantic similarity is a similarity of semantic meaning underlining the concept of different relationships. For example "wed" and "marriage" may have a semantic similarity even though the words are different. "Semantic similarity" itself may be a metric defined over a set of terms, where the concept of "distance" between terms is based on the likeness of their semantic meaning or semantic content as opposed to similarity which can be estimated regarding their syntactical representation (e.g., their string format). Working from a relational database or grammar containing the terms, mathematical rules are used to estimate the strength of the semantic relationship between units of language, concepts or instances, through a numerical description obtained according to the comparison of information supporting their semantic meaning or describing their nature.

Computationally, semantic similarity can be estimated by defining a topological similarity, by using ontologies to define the distance between terms/concepts as represented in the relational structure (e.g., database or grammar). Various techniques may be used by the pattern recognition module 252 to determine a semantic similarity, where the similarity metric is defined for a set of entity terms For example, the terms to be compared are identified within a relational database/grammar. If each term within the database is characterized as being a "node" on a graph, a naive metric may be calculated by counting the "distance" in the terms of the shortest distance from one term to the other term within the graph. Words that have related semantic meanings will be close together in the graph, and may be directly linked to each other within the database/grammar, such that the distance will be small.

As the structure is based on concepts, rather than the words themselves, "marriage," "married," "wed," etc., that all relate to the same concept may be represented by a same node. As such, the naive metric between "marriage" and "wed" may be calculated as zero, as both words are associated with a same semantic meaning. In comparison, "marriage" and "wedding" are related concepts with different semantic meanings, but may be directly linked in the relational structure, producing a naive metric of "one" to traverse the graph from the "marriage" node to the "wedding" node.

As a further example, "ring" may directly link to "wedding" but have no direct "marriage." In terms of a naive metric, a comparison of "ring" with "marriage" may be calculated as two, since to link the concepts of ring with marriage, two hops on the graph are required: from ring to wedding, and from wedding to marriage. Thus, in terms of semantic similarity, based on the naive metrics, "marriage" and "wedding" are more similar than "marriage" and "ring."

Associating words with concepts and semantic meaning may be performed by a natural language understanding (NLU) component 234. Associating words in text with concepts using a stored grammar is a conventional aspect of NLU processing. The relational database/grammar used to calculate semantic similarity is not linking words to concepts as used for NLU, but is instead linking concepts to concepts (although the two structures may be combined, where words having a same semantic meaning have a distance of zero between them).

As an alternative to using a naive metric to calculate the distance between concepts when calculating the semantic similarity, more complex metrics may be used, such as statistics-based metrics calculated using the graph representation between multiple concepts within a processed question.

Vector space models may also be used to determine semantic similarity based on text corpuses. Using the data from one or more "text corpus(es)," the system may analyze individual words and their respective usages. A text corpus is a data collection of text such as sentences, paragraphs, etc. A text corpus 180 may not be a single instance of text, but rather a collection of text that is accessible to the system 100. Examples of text corpuses 180 include periodical archives, websites, books, book collections, encyclopedias, news service content, television or movie scripts, or any other source of text. The system may catalog or otherwise process the information of a text corpus to determine how words are used in the text corpus. Various data may be generated based on this processing and used to compare word usages with each other.

The usage characteristics for a particular word may be specific to a single text corpus 180 or may represent usage of the word as it appears over multiple text corpuses 180. Usage characteristics corresponding to a word may be tracked and represented in a number of different ways. One way of representing word usage characteristics is with a data vector, where the data vector includes a number of characteristics representing how the word issued. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. With vectors available for each word of interest to the system (for example, all or some portion of the words in a text corpus 180, automatic speech recognition (ASR) lexicon, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. An example of an approach to analyzing word similarity as vectorsis "word2vec," as described among other places in "Distributed Representations of Words and Phrases and their Compositionality" by Tomas Mikolov, Ilya Sutskever, Kai Chen, Greg Corrado, and Jeffrey Dean, in Advances in Neural Information Processing Systems 26 (NIPS 2013), pp.

3111-3119. Another example is Stanford Universities "GloVe" project, as described among other places in "GloVe: Global Vectors for Word Representation" by Jeffrey Pennington, Richard Socher, and Christopher D. Manning in the Proceedings of the 2014 Conference on Empirical Methods in Natural Language Processing (EMNLP 2014), pp. 1532-1543. Such vector-based analyses are examples of how semantic similarity may be determined, and other techniques may be used.

Figure 3A:
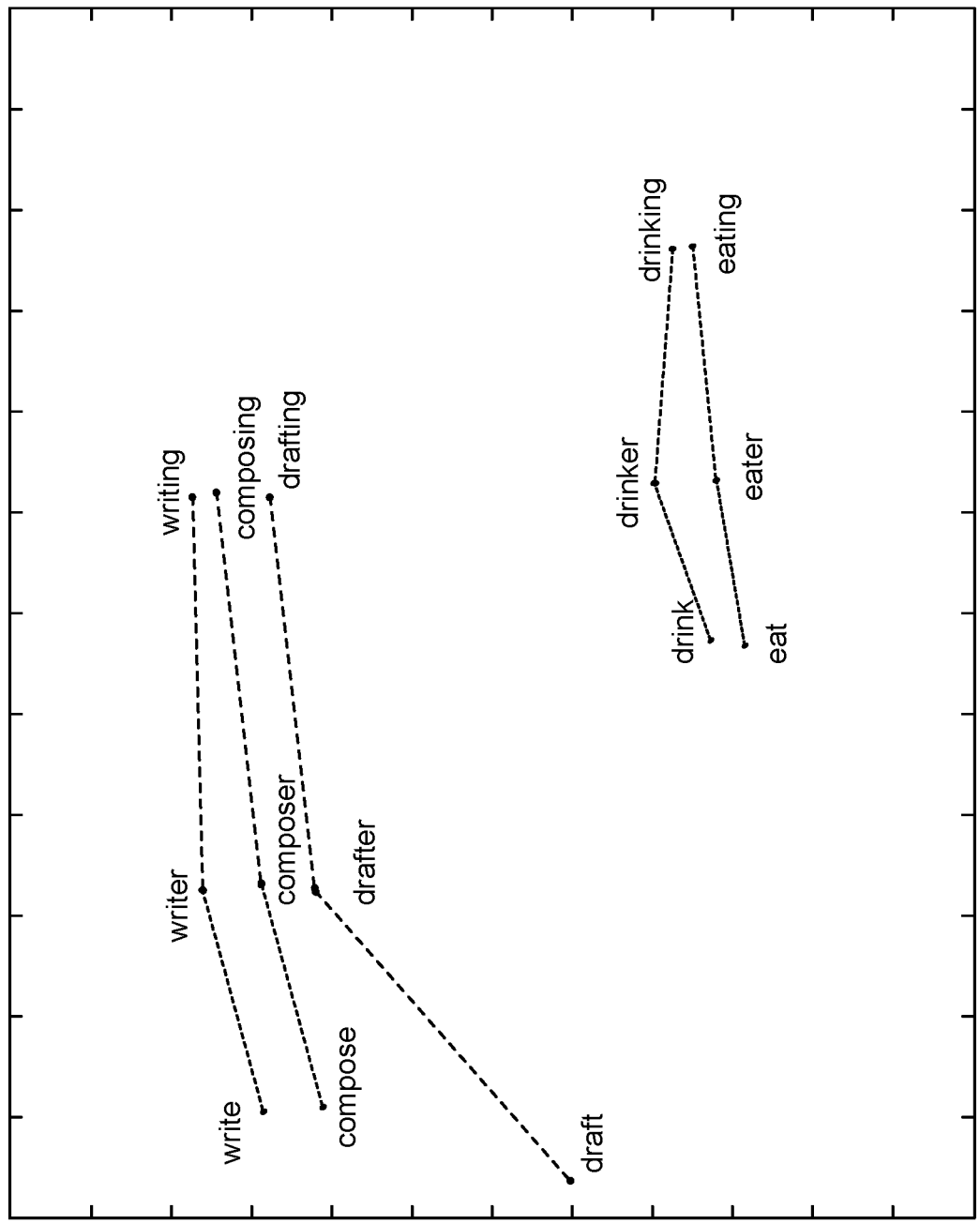
FIG. 3A-3C illustrate representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 3A illustrates a number of words in a hypothetical vector space where each point represents the vector location for the particular word. Although illustrated as located in a two-dimensional graph for discussion purposes, the usage vectors for the words illustrated in FIG. 3A would be in a high dimensional space. Further, FIG. 3A is shown for example purposes only and the vector locations/relationships do not necessarily reflect a true graphing of the usage of the illustrated words.

As illustrated in FIG. 3A, certain words that have similar semantic meaning may be close to each other in the vector space (indicating a similarity of usage characteristics). Also, certain words that have different semantic meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 3A. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other semantic meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 3A exhibit similar relationships to each other as the words discussed above. The words "drink" and "eat" have different semantic meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as using a Levenshtein distance, may be used for determining a difference between word usage, or word usage vectors.

Figure 3B:
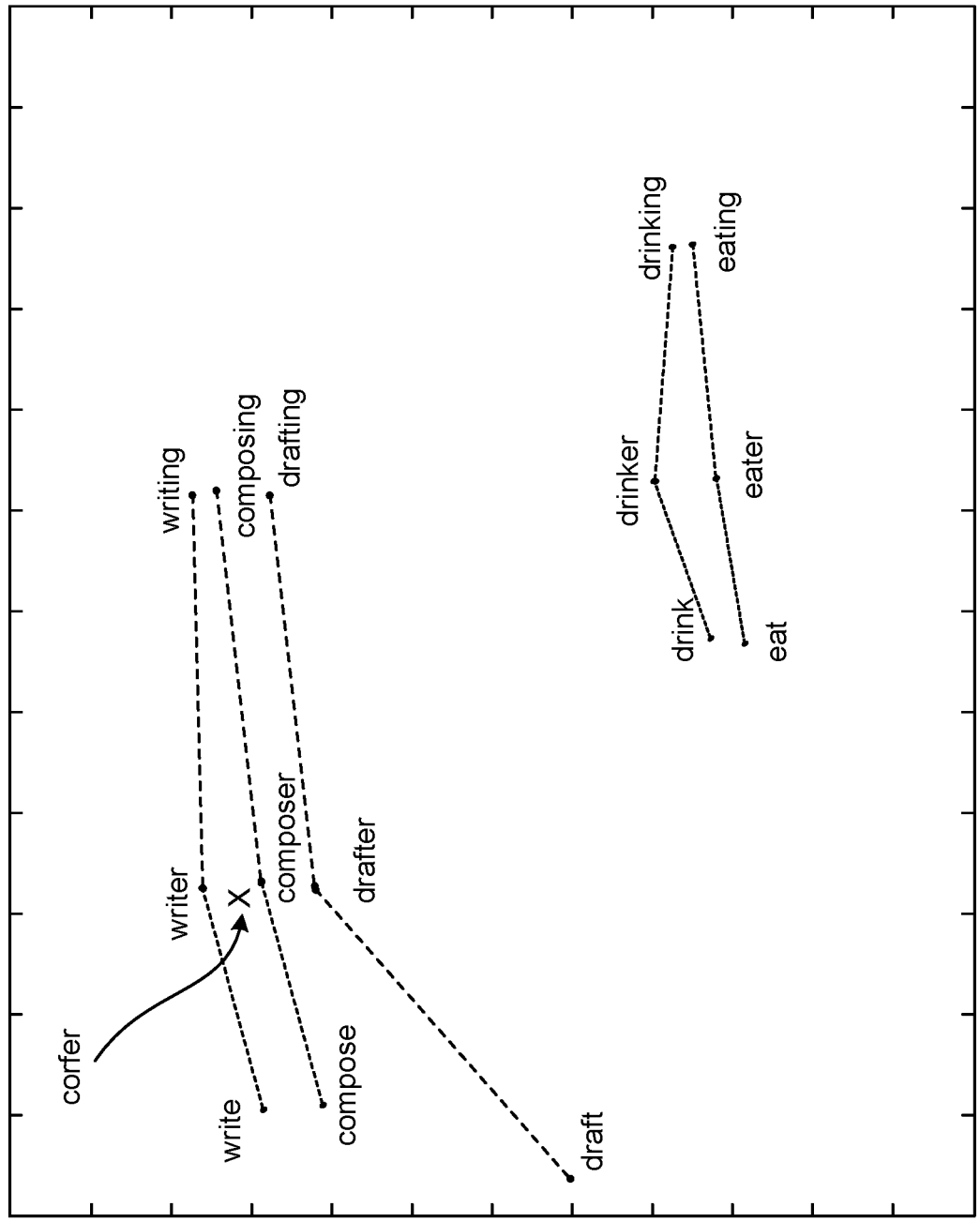

For example, assume a new word "corfer" is identified by the system in a text corpus 180. The system may also recognize that "corfer" is not included in the ASR lexicon 190. The system may have no understanding of the actual semantic meaning of "corfer," however the system may use word usage as a proxy for meaning in order to incorporate "corfer" and/or variations of "corfer" into the ASR lexicon 190 and ultimately into ASR model(s). Thus, using the data from the text corpus 180, the system may determine how the word "corfer" is used, may then create a vector for the usage characteristics of "corfer" and compare that vector to vectors of other known words. For example, as shown in FIG. 3B, a vector for "corfer" may be located between "writer" and "composer" and nearby "drafter." While "corfer" may or may not have a similar semantic meaning to "writer," "composer" and "drafter," the system may create word variations for "corfer" based on the word variations of "writer," "composer" and "drafter." For example, the system may recognize that "er" is a suffix of "writer," "composer" and "drafter," and thus may identify "corf" as the root of "corfer." The system may then use that root to create variations of "corfer" such as "corf" (the root itself), "corfing" (the root plus the suffix "ing" which appears in "writing," "composing," and "drafting") or others. Those variations may then be stored in the ASR lexicon 190 and incorporated into ASR model(s).

Figure 3C:
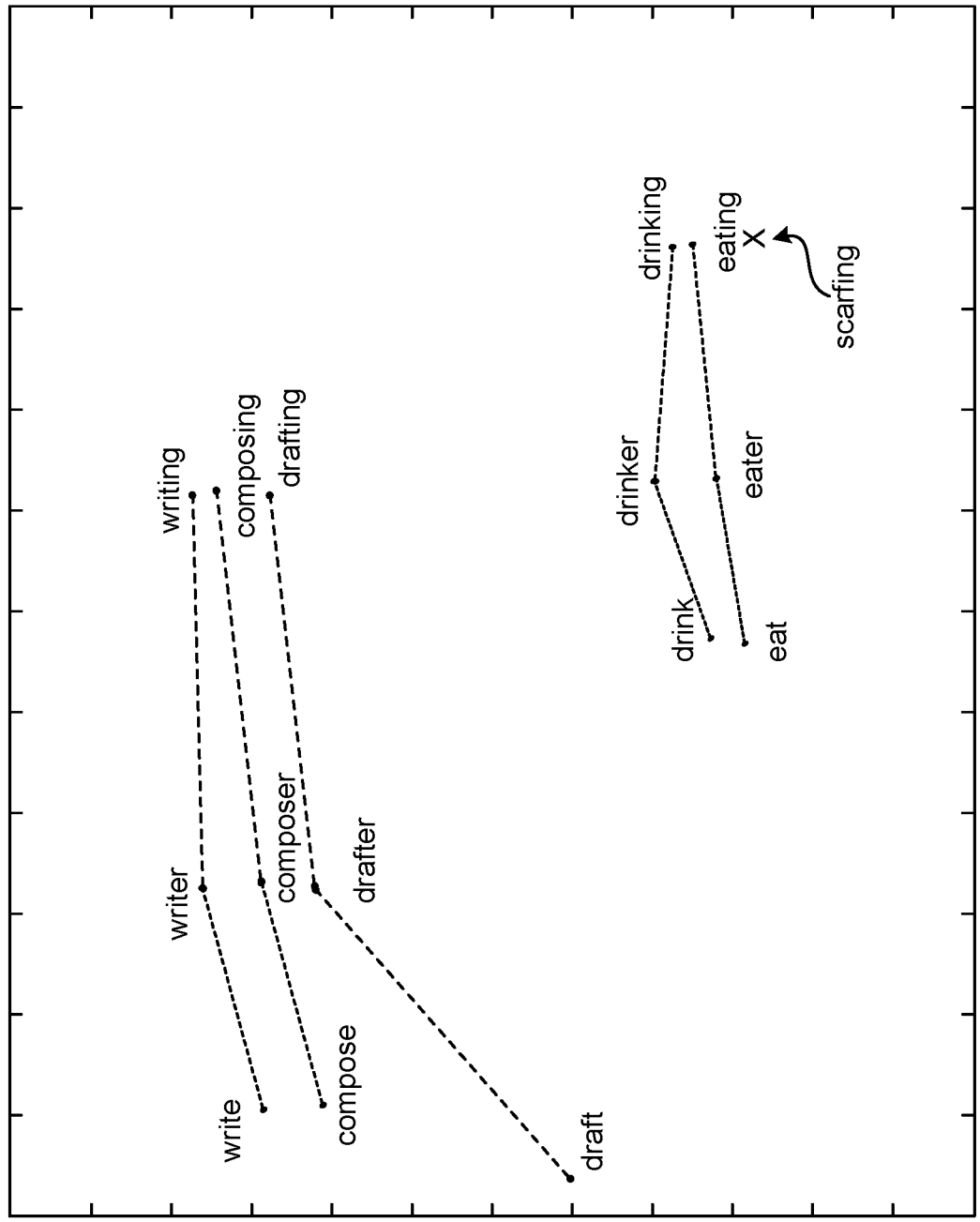

The process may also work with new variations of known words. For example, the word "scarfing" may appear in a text corpus 180, but not in the ASR lexicon. While "scarf" may be a known word, the variation "scarfing" may not be known. The system may determine usage characteristics for "scarfing" and compare those usage characteristics to the usage characteristics of known words. For example, as shown in FIG. 3C, "scarfing" may have similar usage to "drinking" and "eating." The system may recognize that "ing" is a suffix of "eating" and "drinking," and thus may identify "scarf" as the root of "scarfing." The system may then use that root to create variations of "scarfing" such as "scarfer" (the root plus the suffix "er" which appears in "eater" and "drinker"), "scarfable" (the root plus the suffix "able," which appears in "eatable" and "drinkable," not illustrated) or others. The system may not necessarily, in this example, create the root "scarf" as a new word as it may already exist in the ASR lexicon 190 in its noun form related to a winter accessory, which may also mean "scarf" has different usage characteristics than "drink" or "eat."

The system may use a variety of rules to generate derivations based on known word forms (x+s, x+ed, x+ing, etc.) but may only apply those rules where the specific forms are associated with the known word(s) having a similar usage to the new word, as described above. Various techniques or tools may be used to identify root forms, affix forms, compound forms, etc. of words. One example is gensim, an open-source Python module, but other techniques or tools may also be used.

In certain situations, a frequency of occurrence of a particular word variation may be determined prior to creating a variation of a new word. For example, in the example of "scarfing" discussed above, the system may determine that the variations of "drinker" and/or "eater" appear in a text corpus 180 a first number of times and that the variations of "drinkable" and "eatable" appear a second number of times. If the first number of times is above a frequency threshold, but the second number of times is not, the system may create the variation of "scarfer" but not "scarfable."

There are several ways to encode an entity as a vector. Using neural networks is one approach, where the neural network is trained on a large amount of data. The weights learned by the neural network for a word or phrase have a characteristic of capturing semantics. The neural network applies a plurality of non-linear transformation on the data until an error function is minimized, causing the neural network to set intermediate weights. The intermediate weights may be used as semantic vectors. The intermediate weights have properties that make them useful as semantic vectors, although the reasons why have not been fully explained. For example, if the vector for "man" is subtracted from the vector for "king," and the vector for "woman" is added to the result of the subtraction, the resulting intermediate weight vector is close to the vector for "queen." "Close" may be quantified by Euclidean distance and cosine similarity. Another approach to quantifying "close" is Kullback-Leibler (KL) divergence.

For example, if a parsed question has five grammatical components, the relationship pattern recognition engine 252 compares the components with those of other parsed questions that have as many of those same five components in the corresponding sentence position. Based on whether the aggregate similarity between corresponding components exceeds a threshold value, a determination is made as to whether the questions are similar. The comparison may be performed based on the identified relationship frameworks, such as by comparing relationship tuples and the information associated with the entity fields of each tuple.

Identified semantic similarities are passed to a relationship mapper 254. Based on the degree of similarity, the mapper 254 may aggregate common relationships based on their topological similarities (e.g., if their distance is below a threshold value). The common "semantic meaning" assigned to the aggregate relationships (e.g., the dominant semantic meaning of the aggregated relationships having the shortest-path links) may be used to formulate new questions.

Rather than an explicit mapping, semantically similar terms may be compared in an n-dimensional space and the nearest terms selected using a database of related terms and a graph model. The database comprises a hierarchy of terms and concepts, defining an ontology. Each entity fits into the ontology. For example, "Tom Cruise" is a "person" and is also an "actor," where "actor" is subsumed or "person" subsumes actor, where each of these relations is defined in the database.

The semantic similarities which have a highest frequency of occurrence across unanswered questions are selected to be used for collaborative filtering. This may be done based upon a threshold metric value, by selecting a top percentage of the semantic similarities, etc. The purpose of prioritizing which aggregate relationships are used to pursue further questions is to assure that the most popular questions that are going unanswered are addressed before less common questions. This also minimizes the impact of "noise" on the questions presented to the users. For example, when the system misinterprets speech input, the resulting "noise" may not relate to a deficiency in the knowledge base, but rather be the result of a random mistake. Typically, one-off and two-off unanswered questions tend to be the result of noise, rather than a deficiency in the knowledge base.

The selected aggregate relationships are passed to a category classifier 256 that compares the semantic meaning of the aggregate relationship with semantic meanings associated with established categories. The categories need not be explicitly defined. The category classifier 256 may apply machine learning techniques to determine categories in a unsupervised way using topic modeling techniques such as Latent Dirichlet allocation. In natural language processing, Latent Dirichlet allocation (LDA) is a "generative model" that allows sets of observations to be explained by unobserved groups that explain why some parts of the data are similar. In probability and statistics, a generative model is a model for randomly generating observable data values, typically given some hidden parameters. The generative model specifies a joint probability distribution based on analysis of multiple unanswered questions. Based on the distribution of terms calculated by LDA, terms may be ranked in accordance with probability of occurrence, with the highest probability terms with commonality of semantic meaning being the basis for logical categories. Recurrence of these highest probability terms may then be used to identify a category of an unanswered or aggregate question.

If the entity relationship identifier 240 was unable to identify a relationship in a question, a "Chinese restaurant" inference technique may be applied to identify a new relationship. A "Chinese restaurant process," as known in the art, uses variations of Bayesian nonparametric techniques to allow for new and different relationships, by matching an unknown relationship to one or more established categories based on how often the established relationship(s) have been previously selected. Each potential relationship (including both established relationship between entities and the category of "none") is illustrated as a table at a restaurant where new diners are more likely to sit at a table where others are eating than at an empty table.

Three different considerations may be used when classifying an unknown relationship into a category (either established or "none"). The first consideration is the likelihood, which may be represented by the likelihood score discussed above. The second consideration is the prior classifications done by the system 100 and/or processor 120. These prior classifications may be represented by one or more prior scores. Each relationship (including each established relationship categories and the "none" category) may be associated with a prior score, representing some relative value as to how many previous times that particular relationship has been selected. The prior score may be represented in a number of ways, but the prior score may simply be a count, representing the number of times that category has been previously selected.

For example, a relationship may have a prior score of "X," indicating that that particular relationship has been selected in prior occasions, X times. In another example, the prior score may represent a portion of times a particular relationship from a total number of selections. For example, a particular relationship may have been selected X times, but all relationship together have been selected Y times. In such an example, the particular relationship's prior score may be X/Y, which represents the number of times the particular relationship has been selected divided by the total number of relationship selections. The prior scores may be represented by Dirichlet distributions. Prior scores may be updated each time an input sample is processed to be associated with a relationship. As can be envisioned, the prior score is configurable and may be structured in a number of different ways.

As the prior score reflects previous relationship classifications by the system 100, when the VUI Processor 120 is first activated, an initial configured prior score may be set for each individual relationship category. These configured starting prior scores may be referred to as the "initial bias" of the system. In addition to setting an initial bias for each individual category, the "none" category may also receive an initial bias, albeit potentially a small one. When the "none" category is selected and a new relationship is created, the prior score for the "none" category may not change from the initial bias. Rather, the newly established relationship receives the prior score (for example, 1) for the classification of an unknown relationship into the new relationship category. Thus new relationship categories may be created with incrementing prior scores based on their selection, while the initial bias for the "none" category may not change. The initial bias for the "none" category, and for the established relationship, may be configurable.

The third consideration of the "Chinese restaurant process" is a combination of the likelihood and the prior classifications. This third consideration may be called the posterior probability. The posterior probability is a representation of the adjusted likelihood, skewing the likelihood to make it more likely that a new scene is classified into a category that has been repeatedly selected before. Thus the posterior probability is estimated using the likelihood score and the prior score. The precise method of estimated the posterior probability is variable, and may be performed according to Bayesian nonparametric techniques, as known in the art. In one example, an input sample vector corresponding to a scene may be multiplied by a representative vector corresponding to an established category. The resulting vector product may be multiplied by each category's prior score to estimate a posterior probability that the new relationship corresponds to the particular category. As can be appreciated, each incoming data sample may be associated with multiple posterior probability scores, such as one for each category under consideration by the system.

The "none" relationship may not be associated with a representative feature vector. In this case, the posterior probability for an incoming question to be associated with the "none" relationship may be equal to the initial bias for the "none" relationship discussed above. If this initial bias is greater than the calculated posterior probability for the established relationships, the "none" relationship category may be selected and a new relationship established.

Due to the complexity of these calculations, a specific posterior probability score may not be precisely calculable, but the relative posterior probabilities for each category for a particular input sample may be estimated, and thus the VUI Processor 120 may be able to infer a relationship to assign to the particular unanswered question based on these relative posterior probabilities. That is, the relationship with the highest estimated relative posterior probability may be selected as the relationship to which the incoming sample scene should be associated with. The system 100 may then configure its operation based on the selected relationship.

After an aggregate relationship is categorized, a user selector 258 identifies suitable recipient to provide answers based on the category, and recipient's performance in answering questions before in that category, the recipient's performance in answering questions overall, and how many answers the recipient has gotten right in the past. In addition to a category-based leader board, each user/potential recipient may be assigned a confidence level in each category for which they have provided answers in the past. After the confidence score for a fact is revised, each question recipient's/user's score may also be revised. As confidence in a fact increases, if the recipient's/user's answer is consistent with what the system scores as "correct," that recipient's/user's confidence score will be increased. In comparison, if that user's answer is incorrect, the user's confidence score in that category may be reduced.

As a consequence of this approach, if a majority of users and resources believe an incorrect fact to be true, the system 100 may incorrectly determine what is "correct." However, this shortcoming is also true of non-crowdsource systems, since even traditional fact-checked resources may reproduce false information.

The user selector 258 passes information relating to the selected user to a VUI acquisition interface 260. The VUI acquisition interface 260 structures a question to be asked to the user based on the identified aggregate relationship. This may result in the question that the system 100 asks the user 10 being structurally different than the unanswered questions that result in it being asked.

The VUI acquisition interface 260 may use components of the VUI Q/A Module 230 to interact with the user, such as the ASR engine 232, the NLU engine 234, the semantic parser 236, and the NER engine 238.

The facts acquired from the users may also be compared with information acquired by an evidence retrieval engine 264. As noted above, evidence retrieval may be based on data mining "evidence retrieval techniques," such as text searches of online news services and online encyclopedias for fact validation, inter-annotator-agreement (e.g., a score of how much homogeneity, or consensus, there is regarding the "fact" between sources), and a quantification of how many news and other websites link to a website validating a fact, in addition to a "teacher's" past record of quality knowledge transfer (as represented by the confidence score attributed to the user, such as might be indicated by a leaderboard and/or in user database 126).

The confidence quantification and fact results data from the VUI acquisition interface 260 and the evidence retrieval engine 264 are provided to a confidence scorer 266, which selects a resulting answer from the available answers and assigns an aggregate score. The confidence scorer 266 may be a trained classifier outputting a score in response to input data. Examples of suitable trained classifiers include a neural network, a maximum entropy classifier, a support vector machine, or a logistic regression classifier. The classifier is trained by providing it data sets including answers with varying degrees of accuracy, along with an indication of what the correct answer actually is. When input data corroborates a fact, the confidence score associated with the fact is increased. Likewise, when input data refutes a fact, the confidence score is decreased.

The classifier's models continue to update as additional users provide quantifiably correct and incorrect answers to further refine scores. Features provided as input to the classifier may include, among other things, how many answers an answering user has gotten correct in the past, the overall percentage of questions the user has gotten correct, what entities were contained within the questions that the respective user got correct, the number of questions the user has gotten correct within a set time period (e.g., within the previous month), the topic of the question, how many questions the user has gotten right in the topic area, how many users have answered a question the same way (i.e., inter-annotator agreement), a percentage of how many user have answered the question the same way, the confidence score(s) associated with answer based on inter-annotator agreement, a number and/or percentage of sources indicating the same answer based on data mining, etc., producing a weighted voting scheme where each user has a vote, but the votes are weighted based on each user's personal confidence score based on their past answers, and based on inter-annotator agreement.

Although heuristic rules may be used to set a confidence score instead of using a trained classifier, the benefit of using a trained classifier to calibrate the confidence score instead of applying a weighted increase or decrease to confidence scores after new answers are received is the classifier can distill multiple inputs base on non-linear relationships to a single output (i.e., the score) with better adaptivity than statistical and heuristic techniques. The classifier performs a binary prediction (zero or one) as to whether the answer is correct based on the input features, with the score corresponding to a confidence value in the binary prediction. The models, which are initially built by training the classifier with annotated examples, may be continually updated as more answers are received from users, adaptively refining the models through usage.

The confidence score assigned to each user may be an average of the answer scores to which those users have contributed (e.g., every question that they answered). Circularly, the confidence score assigned to each user is used to weight that user's answers when new answers are received and the results are provided to the confidence scorer 266, such that each user's past score contributes feedback to the respective user's future confidence score after answering another question. The models may not be updated every time an answer is received, but further trained based on batches of data. For example, after ten new answers to a question that each have a confidence score over a threshold value, the model may be updated using the feature information associated with the answers and the users providing the answers.

If the assigned score is above a threshold value, it is added to the knowledge base 122 and treated as a "fact." Otherwise, the collaborative filtering process continues, and the more users are selected to further refine confidence that the dominant answer is the correct answer. The accuracy of the system depends in part on trust in the users, as reflected by the confidence score attributed to each user, since the reliance on inter-annotator agreement means that if a majority of users believe an incorrect fact to be true, the resulting confidence scores may result in incorrect information being treated as "true."

Multiple VUI devices 110, VUI Processors 120, and knowledge bases 122 may be employed in a single system 100. In such a multi-device system, each of the VUI devices 110 and VUI Processors 120 may include different components for performing different aspects of the VUI Q/A and knowledge acquisition processes. The multiple devices may include overlapping components. The components of VUI Processor 120 as illustrated in FIG. 2 is an example. In a typical implementation, the different components of the VUI Processor 120 may be distributed across multiple devices.

Figure 4A:
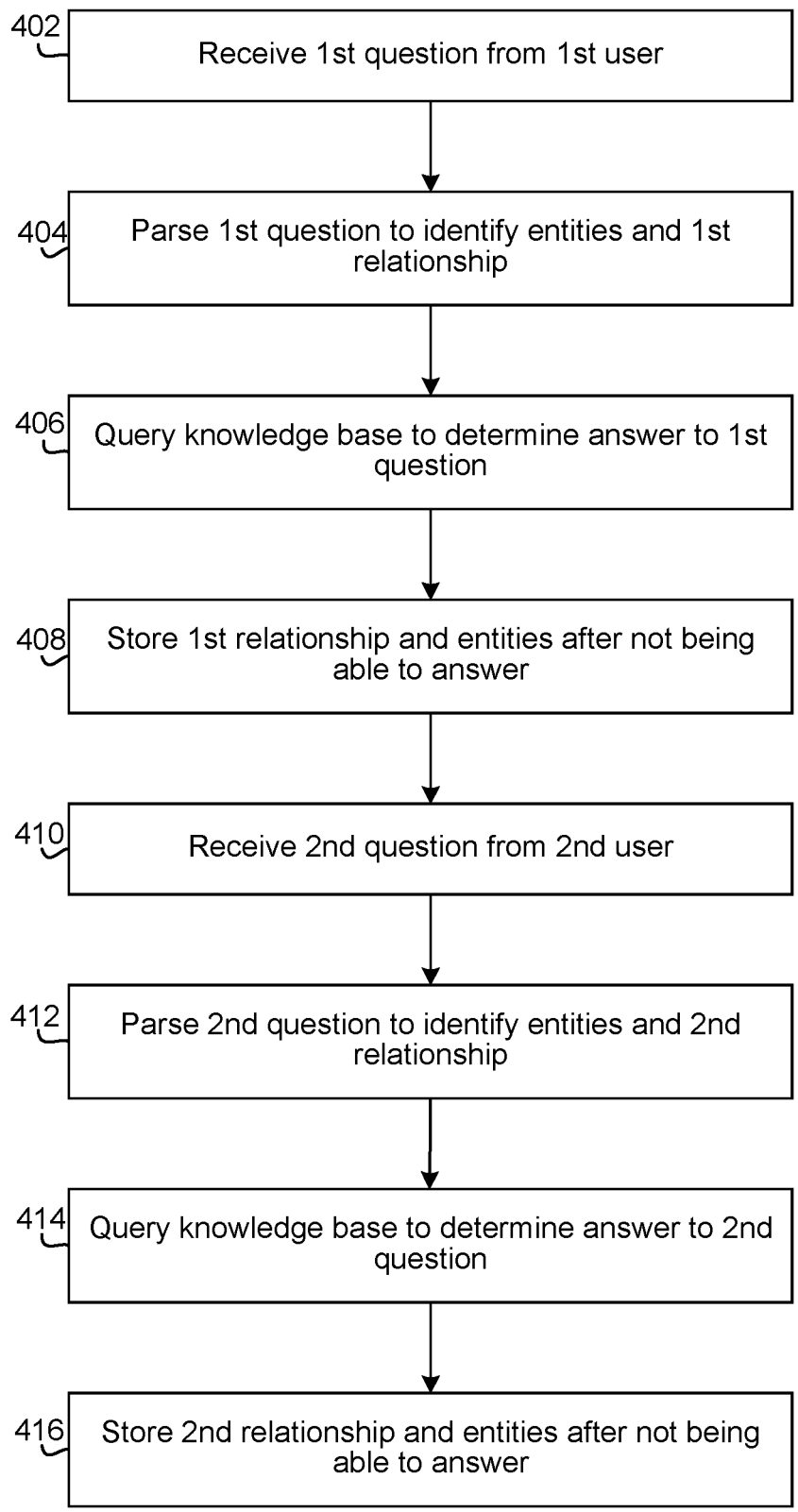
FIGS. 4A and 4B illustrate examples of a process flow of the VUI Processor 120.
Figure 4B:
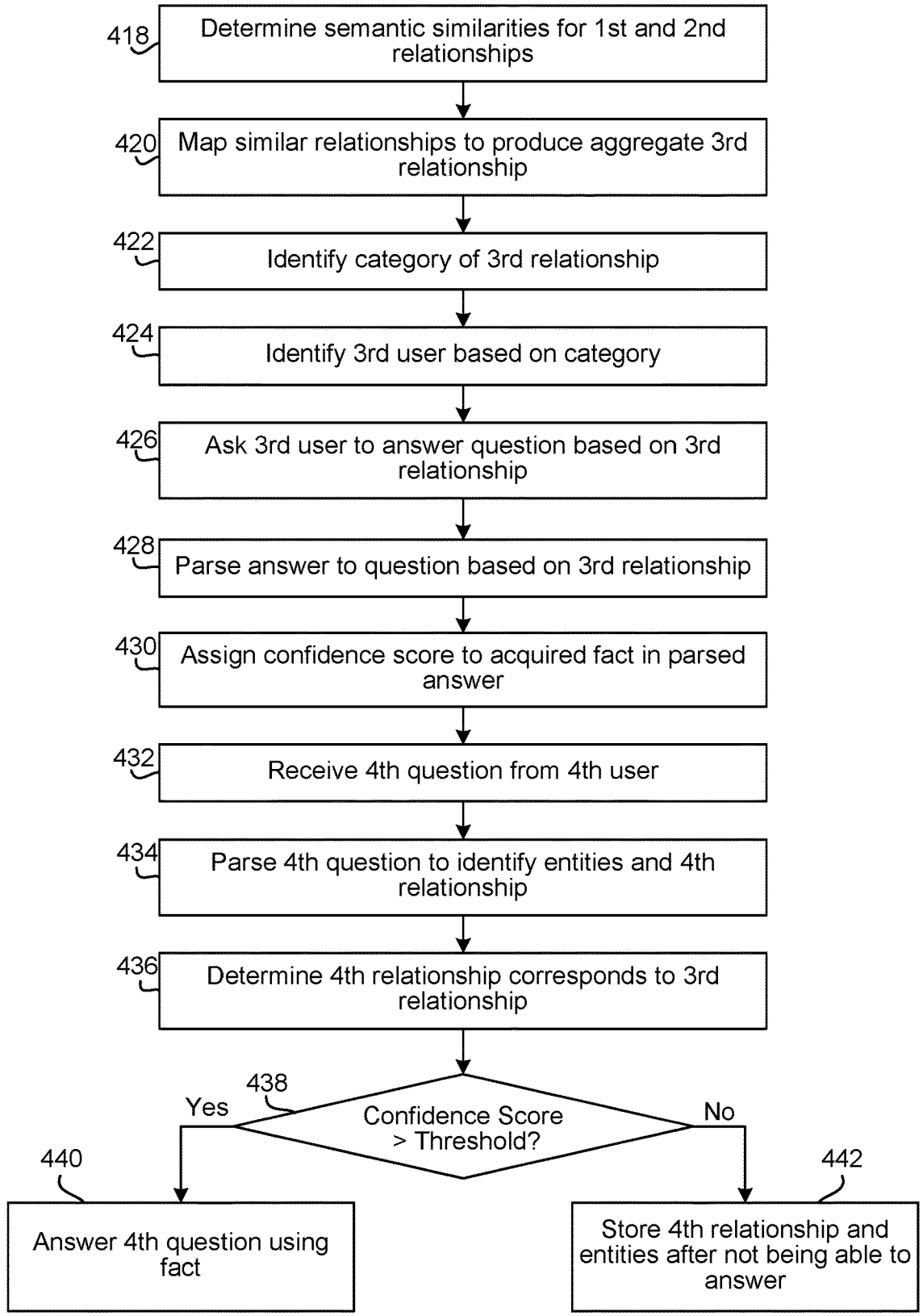

FIGS. 4A and 4B are examples of process flows performed by the VUI Processor 120. In FIG. 4A, a first question is received (402) from a first user. The first question is parsed (404) to identify entities in the question and a first relationship between the entities. The knowledge base 122 is queried (406) to determine an answer to the first question. Upon being unable to correctly answer the first question, information from the parsed first question is stored (408) with an indication that it was not resolved based on the query to the knowledge base.

Thereafter, a second question is received (410) from a second user. The second question is parsed (412) to identify entities in the question and a second relationship between the entities. The knowledge base 122 is queried (414) to determine an answer to the second question. Upon being unable to correctly answer the second question, information from the parsed first question is stored (416) with an indication that it was not resolved based on the query to the knowledge base.

Thereafter, in FIG. 4B, semantic similarities are determined (418) between the stored information based on the first and second questions. The similarities are mapped (420) to produce a third relationship based on the first relationship and the second relationship. A topic category is determined (422) for the third relationship.

A third user is identified (424) based on a quality of past answers that user has provided for the topic category. The third user is asked (426) to answer a third question based on the third relationship. The answer is parsed (428) to extract an acquired fact from the answer, and a confidence score is assigned (430) to the fact.

Thereafter, a fourth question is received (432) from a fourth user. Parsing (434) of the fourth question results in the first entity, the second entity, and a fourth relationship between the first and second entities that comprises the fourth question. A determination (436) is made that the fourth relationship corresponds to the third relationship.

If the confidence score assigned to the sought fact is greater than a threshold score (438 "Yes"), then the fourth question is answered (440) using the fact. Otherwise (438 "No"), information from the parsed fourth question is stored (442) with an indication that it was not resolved based on the query to the knowledge base.

The concepts disclosed herein may be applied within a number of different devices and computer systems that support speech-interactive VUIs, including, for example, general-purpose computing systems, multimedia set-top boxes, televisions, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, natural language processing, and VUI-based assistants, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines/components of the VUI Q/A module 230 and knowledge acquisition module 250 may be implemented as firmware in hardware. For example, at least the ASR engine 232 of the VUI Q/A module 230 may be implemented as an application specific integrated circuit (ASIC), a digital signal processor (DSP), or some combination thereof.

As used in this disclosure, the term "a" or "one" may include one or more items unless specifically stated otherwise. Further, the phrase "based on" is intended to mean "based at least in part on" unless specifically stated otherwise.

What is claimed is:

1. A method for obtaining information for a knowledge base, the method comprising:
   receiving first text comprising a first question;
   processing the first text to identify representations of a first entity, a second entity, and a potential first relationship between the first entity and the second entity;
   determining that the first entity and the second entity are not associated by the potential first relationship in a knowledge base;
   storing the first text with an indication that the knowledge base did not provide an answer to the first question;
   comparing the first text with second text comprising a second question;
   determining a similarity between the potential first relationship and a potential second relationship associated with the second question;
   generating a third question based on semantic meanings associated with words in the first and second questions;
   determining a topic category that is shared by the potential first relationship and the potential second relationship;
   determining at least a first user and a second user that provided answers to past questions in the topic category;
   determining a first score for the first user based on a number of answers provided by the first user in the topic category;
   determining a second score for the second user based on a number of answers provided by the second user in the topic category;
   selecting the first user based at least in part on the first score being higher than the second score;
   sending third text comprising the third question to a user device associated with the first user;
   receiving data representing a third answer to the third question;
   determining a first confidence level associated with the first user, the first confidence level based at least in part on previous answers provided by the first user;
   assigning a second confidence level to the third answer based at least in part on the first confidence level; and
   determining that the second confidence level exceeds a first threshold.

2. The method of claim 1, wherein determining the similarity further comprises:
   modelling the potential first relationship and potential second relationship in a graph;
   determining a distance between the potential first relationship and potential second relationship as represented in the graph; and
   determining that the distance is below a threshold distance.

3. The method of claim 1, further comprising:
   storing the third answer;
   receiving input audio data corresponding to a user utterance including a fourth question;
   determining the third answer corresponds to the fourth question; and
   generating output data based on the third answer.

4. The method of claim 1, further comprising:
   sending the third text to an additional user device associated with a third user; and
   determining a third confidence level associated with the third user, the third confidence level based at least in part on previous answers provided by the third user,
   wherein assigning the second confidence level to the third answer is further based at least in part on the third confidence level.

5. The method of claim 1, further comprising:
   receiving fourth text comprising a fourth question;
   receiving fifth text comprising a fifth question;
   determining that the fourth question and the fifth question correspond to a first fact; and
   determining that the third answer corresponds to the first fact.

6. The method of claim 1, further comprising:
   generating a first tuple including the first entity, the potential first relationship and the second entity,
   wherein determining the similarity between the potential first relationship and the potential second relationship comprises comparing the first tuple and a second tuple associated with the second question.

7. The method of claim 1, wherein assigning the second confidence level to the third answer comprises:
   determining a number of users that have provided an answer to the third question, wherein the answer is similar to the third answer; and
   processing, using a trained classifier, at least one of the first confidence level, the first score, or the number of users.

8. A computing system comprising:
   at least one processor;
   a memory including instructions operable to be executed by the at least one processor to configure the system to:
      determine a first question, the first question comprising a first relationship between entities;
      determine a second question, the second question comprising a second relationship between the entities;
      determine a similarity between the first relationship and the second relationship;
      generate a new question based on the similarity;
      determine a first user based on a first user confidence value corresponding to the first user, wherein the first user confidence value is determined based on a number of answers provided by the first user to past questions;
      send the new question to a first user device associated with the first user;
      process a first answer, the first answer relating to the entities;
      assign a fact confidence value to the first answer based on at least the first user confidence value;
      determine the fact confidence value exceeds a threshold confidence level; and
      store the first answer.

9. The computing system of claim 8, wherein the instructions to determine the similarity between the first relationship and the second relationship configure the system to:
  determine a first semantic meaning associated with one or more words of the first relationship;
  determine a second semantic meaning associated with one or more words of the second relationship;
  determine a distance between the first semantic meaning and the second semantic meaning in a graph of semantic meanings; and
  determine that the distance is below a threshold distance.

10. The computing system of claim 9, wherein the first semantic meaning corresponds to a first node on the graph, and the second semantic meaning corresponds to a second node on the graph, and the distance corresponds to a number of nodes that are traversed on the graph to travel a shortest path from the first node to the second node.

11. The computing system of claim 8, wherein the memory further includes instructions operable to be executed by the at least one processor that further configure the system to:
  determine a category of the new question; and
  identify the first user based on the first user having answered past questions in the category, wherein the first user confidence value is based on the first user's answers to the past questions in the category.

12. The computing system of claim 11, wherein the memory further includes instructions operable to be executed by the at least one processor that further configure the system to:
  identify a second user based on the second user having answered past questions in the category, the second user having a second user confidence value based on the second user's answers to the past questions;
  send the new question to a second user device associated with the second user;
  process a second answer received from the second user device, the second answer relating to the entities;
  determine that the second answer corroborates the first answer; and
  increase the fact confidence value.

13. The computing system of claim 12, wherein the memory further includes instructions operable to be executed by the at least one processor that further configure the system to:
  increase the first user confidence value based on the first answer being corroborated by the second answer.

14. The computing system of claim 11, wherein the instructions to assign the fact confidence value further configure the system to:
  input the first user confidence value into a classifier, wherein the fact confidence value is based on a classifier score output by the classifier.

15. The computing system of claim 11, wherein the instructions to determine the category of the new question further configure the system to:
  determine occurrence probabilities for semantic meanings associated with words in a plurality of entity relationships of past answered questions;
  define categories based on the probabilities; and
  categorize the new question based on the defined categories.

16. The computing system of claim 12, wherein the memory further includes instructions operable to be executed by the at least one processor that further configure the system to:
  search an electronic data source for a second answer to the new question;
  determine that the second answer obtained from the electronic data source corroborates the first answer; and
  increase the fact confidence value.

17. A method comprising:
  determining a first question, the first question comprising a first relationship between entities;
  determining a second question, the second question comprising a second relationship between the entities;
  determining a similarity between the first relationship and the second relationship;
  generating a new question based on the similarity;
  determining a first user based on a first user confidence value corresponding to the first user, wherein the first user confidence value is determined based on a number of answers provided by the first user to past questions;
  sending the new question to a first user device associated with the first user;
  process a first answer, the first answer relating to the entities;
  assigning a fact confidence value to the first answer based at least in part on the first user confidence value;
  determining the fact confidence value exceeds a threshold confidence level; and
  storing the first answer.

18. The method of claim 17, wherein determining the similarity between the first relationship and the second relationship comprises:
  determining a first semantic meaning associated with one or more words of the first relationship;
  determining a second semantic meaning associated with one or more words of the second relationship;
  determining a distance between the first semantic meaning and the second semantic meaning in graph of semantic meanings; and
  determining that the distance is below a threshold distance.

19. The method of claim 18, wherein the first semantic meaning corresponds to a first node on the graph, and the second semantic meaning corresponds to a second node on the graph, and the distance corresponds to a number of nodes that are traversed on the graph to travel a shortest path from the first node to the second node.

20. The method of claim 17, further comprising:
  determining a category of the new question; and
  identifying the first user based on the first user having answered past questions in the category, wherein the first user confidence value is based on the first user's answers to the past questions in the category.

21. The method of claim 20, further comprising:
  identifying a second user based on the second user having answered past questions in the category, the second user having a second user confidence value based on the second user's answers to the past questions;
  sending the new question to a second user device associated with the second user;
  processing a second answer received from the second user device, the second answer relating to the entities;
  determining that the second answer corroborates the first answer; and
  increasing the fact confidence value.

22. The method of claim 21, further comprising:
  increasing the first user confidence value based on the first answer being corroborated by the second answer.

23. The method of claim 20, wherein assigning the fact confidence value comprises:

inputting the first user confidence value into a classifier, wherein the fact confidence value is based on a classifier score output by the classifier.

24. The method of claim 20, wherein determining the category of the new question comprises:
determining occurrence probabilities for semantic meanings associated with words in a plurality of entity relationships of past answered questions;
defining categories based on the probabilities; and
categorizing the new question based on the defined categories.

25. The method of claim 17, further comprising:
searching an electronic data source for a second answer to the new question;
determining that the second answer obtained from the electronic data source corroborates the first answer; and
increasing the fact confidence value.

* * * * *